United States Patent Office 2,996,288
Patented Aug. 15, 1961

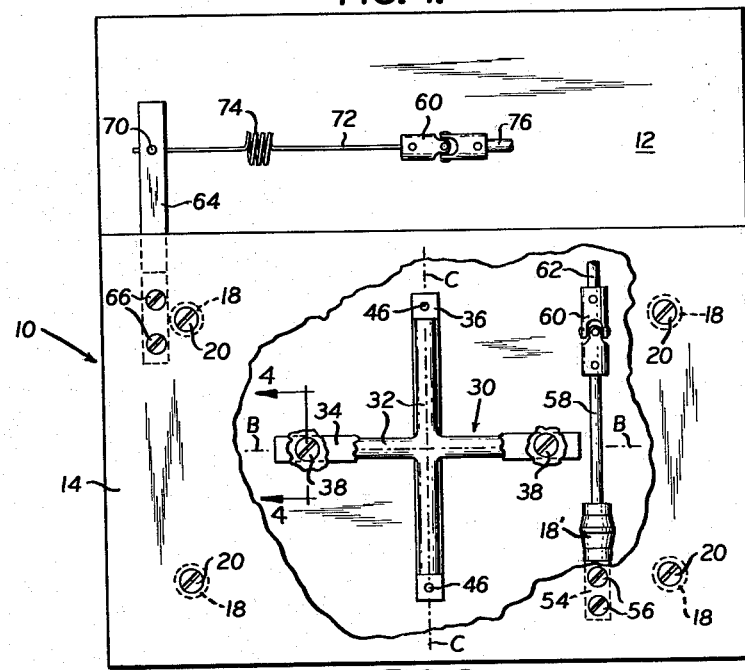
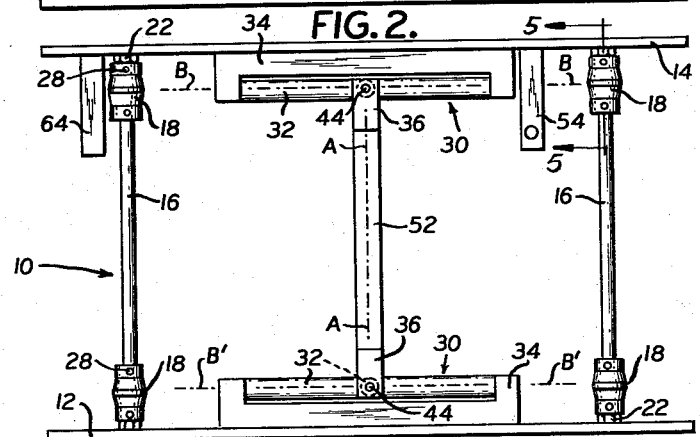
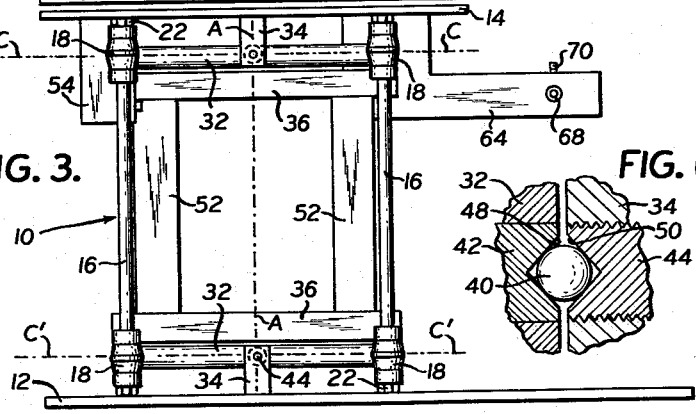
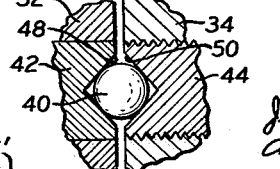
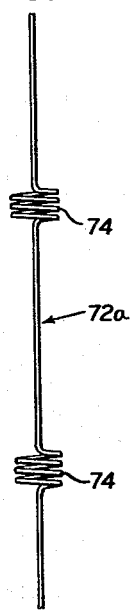

2,996,288
DISPLACEABLE SUPPORT OR COUPLING MECHANISMS RESULTING IN A UNIVERSAL PLATE
Julian Lee Kavanau, New York, N.Y. (937 Gayley Ave., Los Angeles 24, Calif.), and Nils Arthur Jernberg, 110—20 71st Ave., Forest Hills 75, N.Y.
Filed Mar. 15, 1957, Ser. No. 646,431
13 Claims. (Cl. 259—72)

SUMMARY

This invention relates to a universally displaceable mechanism having a working surface which is rigid as regards rotation in its own plane but which is freely laterally displaceable within the approximate plane of the surface itself.

In the prior art, the universal joint allows a more or less universal directional orientation about a point, but without permitting twisting or rotation; in our invention we provide a mechanism, the working surface of which is capable of universal lateral translational displacement, essentially within a plane, but which cannot be rotated within the plane of said working surface. This invention, which for brevity is hereinafter referred to as a "universal plate," has been designed primarily to provide a working surface or support plate, comprising the displaceable component of a shaker or vibrator, but said working surface or support plate could also be used in certain applications where universal lateral translational displacement of materials, components or platforms within circumscribed areas were desired.

The advantages of our universal plate are, that it is of exceedingly simple construction, that it is silent and essentially frictionless, even under heavy loading, that it is rugged and of virtually unlimited load capacity, that it can be driven by drive shafts set at any position and oriented in any direction parallel to the plane of the support plate (by virtue of the fact that said support plate is rigid to rotation within its plane), and that said support plate can be displaced in any direction parallel to its plane while yet being substantially rigid to rotation within that plane. In the prior art no support plate exists which incorporates all the above-mentioned features. In fact, we are not aware of the existence of even a support plate which allows complete lateral translational freedom and is substantially rigid to rotation.

In the field of shakers and vibrators for scientific and industrial uses, prior art support plates are generally set on bearings and confined either to allow only linear reciprocating motion of set amplitude along a fixed axis or only circular displacement of set amplitude in a fixed track. In such cases the full weight of the load is absorbed by the bearing surfaces. Heavy loads thus give rise to greater friction and greater noise. In the case of our universal plate there is no limitation to the path of lateral shaking or vibrational movement, for this is determined solely by the impulses imparted to the support plate by the drive shafts, and the weight of increased loads does not result in increased noise—noise being entirely absent—nor scarcely even in increased friction on the bearings, for said universal plate incorporates the use of flexible support couplings so aligned as to absorb the weight of increased loads on the support plate to a very great extent, and to provide "spring-loading" of said support plate under lateral displacements.

Bearing in mind the foregoing, it is a major object of the present invention to provide a universal plate which is extremely simple in operation, rugged, and of relatively simple construction.

It is another object of the present invention to provide a universal plate wherein a novel double universal-joint enables lateral displacement of the working surface of said plate in the approximate plane of said surface, with negligible rotation of said surface in its own plane.

Still a further object of the present invention is to provide a novel double universal-joint which enables free lateral displacement in the plane of its working surface or attachment surface without any substantial rotational movement of said surface in its own plane, said double universal-joint having a plurality of ball-and-socket type bearings of adjustable type whereby any play in said bearings due to wear, or the like, is automatically taken up by automatic adjustment means, or can be taken up by manual means.

A further object of the present invention is to provide a universal plate which is essentially silent in operation and which allows complete lateral translation of its working surface or support plate without any rotational freedom in the plane of said surface for plate.

A further object of the present invention is to provide a universal plate wherein novel compound flexible couplings between its working surface or support plate and a drive means therefor are employed.

Another object of the present invention is to provide a universal plate adapted to be driven by a plurality of drive shafts and adapted also to be driven by a single one only of said drive shafts, the apparatus having by-pass means for by-passing the impulses of the remaining drive shafts.

Still a further object of the present invention is to provide a universal plate having a flexibly mounted support plate movable in its own plane, whereby any loading placed upon said support plate is partially transferred to the flexible mountings of said support plate rather than being applied entirely to the bearing surfaces of the universal plate.

Yet another object of the present invention is to provide a universal plate of the type described having a novel central double universal-joint mounting, in combination with one or more peripheral, flexible, double universal mountings for the purpose of obtaining absorption of increased loads by said peripheral mountings while retaining lateral movement in the plane of the working surfaces of said universal plate with negligible rotation of said surface in its plane.

These and other objects of the present invention will become more clearly understood by reference to the following description, and to the following figures, in which:

FIGURE 1 is a plan view of our universal plate, a portion of the support plate being cut away to show a plan view of one end of our novel double universal-joint;

FIGURE 2 is a side elevational view of the universal plate shown in FIGURE 1;

FIGURE 3 is an end elevational view of the universal plate shown in FIGURE 1, as viewed from the right-hand end thereof;

FIGURE 4 is a view in cross section along the line 4—4 of FIGURE 1;

FIGURE 5 is a view in cross section along the line 5—5 of FIGURE 2;

FIGURE 6 is an enlarged view of the ball-and-socket joint shown in FIGURE 4; and FIGURE 7 is an alternative form of compound coupling used in connection with our universal plate.

IN GENERAL

The basic design of our universal plate incorporates a support plate or working surface supported on legs which are affixed both to said plate or surface and to a base plate by joints or couplings having universal action. The optimum construction is one in which a novel double universal-joint acts as the central support leg or suspension pillar and motion-limiting guide, providing for the confinement of said support plate to lateral displacements with negligible rotation, said lateral displacements being in approximately the plane of the support plate itself. Four other legs placed near the corners provide peripheral guidance and prevent tipping or tilting of the support plate. Said tipping or tilting could occur, otherwise, by rotation about the minor axes of said double universal-joint. Said peripheral support legs are each universally mounted at the top and bottom thereof and also provide elasticity or spring-loading of said support plate, thereby absorbing the weight of increased loads, which weight would otherwise be applied directly and solely to the articulating surfaces of the ball-and-socket type bearings. Furthermore, the support plate always tends to return to its central or neutral position.

All of the above functions of the four peripheral support legs are achieved through the use of flexible rubber couplings which affix the shafts of these legs to both the support plate and the base plate. Other variations of the same principle which we have originated and tested, involve the use of ordinary universal joints and flexible rubber couplings in various combinations. However, said variations suffer the defects that ordinary universal joints are less rigid than the aforementioned novel double universal-joint, entail more friction under loaded operating conditions and wear out quickly, without incorporating a means for readjustment—to take up the "play" developing from said wear. On the other hand, our double universal-joint employs manually or automatically adjustable ball-and-socket type bearings so that any play developing in said bearings as a result of long continued use is either automatically eliminated or can be eliminated by simple manual adjustments. In addition, the design of said double universal-joint is such that, even were a comparatively large play to develop within the individual bearings themselves, the resulting twisting or rotational freedom would be negligible.

The displacement or actuation of the support plate involves the use of novel compound couplings affixing the drive shafts to said plate. If two perpendicular drive shafts are employed, any given linear or planar lateral translational displacements of said support plate can be attained—by feeding in the appropriate movements to said drive shafts. However, the couplings between said drive shafts and said support plate must be capable not only of bending at both points of attachment to the foregoing objects, but must also be capable of being stretched and compressed, for, although the drive shafts themselves are oriented in fixed directions, the support plate can be displaced transversely to said shafts, as well as along the line of motion of each. Thus, a direct linear displacement of said support plate by one of said shafts accomplishes a transverse displacement of said support plate with respect to the second of said shafts, since said second shaft is oriented perpendicularly to the first. Additionally, lateral displacements of the support plate at different distances from the central position are accompanied by displacements perpendicular to the plane of said support plate, i.e., in the vertical direction, and this fact also leads to the requirement of couplings capable of bending, extension or compression.

The compound couplings employed consist, at one end, of an ordinary universal joint and a length of rigid shaft or flexible wire—the longer the better—and, at the other end, a helical compression spring or a flexible rubber coupling. An ordinary universal joint (at the drive-shaft end) allows for free bending of the coupling at that end, so that no transverse bending moments are brought to bear on the drive shaft, while the combination of the straight length of rigid shaft plus the flexible rubber coupling, or the combination of the straight length of spring wire and relatively strong compression spring, provide for bending at the point of mounting to the support plate, as well as for compressibility and extensibility. Alternatively, a simple length of spring wire could be used as a coupling, but would be inferior.

For applications where it is desired, at times, to utilize impulses imparted by only one drive shaft, so as, for example, to obtain pure linear reciprocating motion of the support plate, a method has been devised for by-passing the impulses of the second drive shaft. This is accomplished by disengaging the compound coupling at either its point of attachment to the support plate or to said second drive shaft in a manner so simple as to involve only the loosening of a screw, the subsequent tightening of which re-engages said compound coupling to said support plate or drive shaft.

DETAILED DESCRIPTION (A) *The double universal joint*

Our double universal-joint 30—52—30 consists of two identical single universal-joints 30, of special construction, connected by means of two coupling pillars 52. Each of said single universal-joints 30 consists of an axial right-angled cross-bar 32 mounted by means of ball-and-socket type bearings 42—40—44 between two yokes 34, 36 of identical construction and homologous function. The proximal yokes 36 are parallel to one another and are rigidly connected by the coupling pillars 52. Said coupling pillars 52 fix the major axis A—A of said double universal-joint 30—52—30, about which axis A—A said double universal joint 30—52—30 cannot be twisted. The distal yokes or attachment members 34 are also oriented parallel to one another but are bolted 38 rigidly to the lower fixed plate or surface 12 and to the upper plate 14, respectively, between which double universal action is desired. The axial cross-bars 32 define the four minor axes B—B, B'—B', C—C, C'—C' about which rotation (but of limited amplitude) can occur freely. Said rotational freedom is effected by having both of the sets of arms constituting each axial cross-bar 32 articulate with their respective yokes 34, 36 by means of paired ball-and-socket type bearings 42—40—44. As the plate 14 moves, for example, in the direction of minor axis C—C, in the plane of the paper (as seen in FIG. 1), it will be seen that the upper universal joint 30 rotates about its minor axis B—B, pillars 52 (attached to yokes 36) tilt out of the plane of the paper (as shown in FIG. 2) and cause rotation about the minor axis B'—B'. There is sufficient clearance 37 between the yokes 34 and the adjacent cross-bars 30 to enable a large amount of tilting of pillars 52 to take place without binding of the cross-bars 30 onto the yokes 34, the amount of clearance 37 required being very small for large tilt angles.

Rotation within the plane of the axial cross-bar 32, i.e., about the major axis A—A, is not possible, because the ends of each set of arms of said cross-bar 32 are fixed rigidly by said paired bearings 42—40—44, insofar as displacements permitting such rotation are concerned. In addition, the distance between any given opposed pair of said ball-and-socket type bearings 42—40—44, constituting a simple rotational joint, is so great relative to the dimensions of the bearing components 40, 42, 44, that, even should play develop or exist within said bearings 42—40—44 themselves, the extent of rotational play of the axial cross-bars 32 about any axes other than the minor axes B—B, B'—B', C—C, C'—C' would be almost entirely negligible.

(B) *The ball-and-socket bearings*

The ball-and-socket type bearings 42—40—44 consists of a hardened ball 40 set between two conical sockets 48, 50 in hardened pins 42, 44. These pins 42, 44 are mounted in the outer ends of the arms of the axial cross-bars 32, and in the inner opposed projections of the yokes 34, 36. One of said pins 42 is permanently fixed within the outer ends of the arms of the axial cross-bars 32, whereas the other of said pins 44 is adjustable, being threaded into its mounting 34. After adjustment of said threaded pins 44 to give the desired tension within any given pair of bearings 42—40—44 of any single joint, these pins can be locked in the desired position by tightening the set screws 46 provided for this purpose. In this way, play developing as a result of wear can be taken up periodically as needed. Alternatively, the movable pins 44 could be modified slightly and kept under spring tension (not shown) so as to attain such adjustment automatically.

(C) The attachment surfaces 12, 14

One of said attachment surfaces 12 is fixed, constituting the base plate 12 from which is suspended or supported the other of said surfaces 14, which "floats" freely with double universal action and constitutes the support plate or working surface 14. The actuating or control mechanism (not shown) would make connection with the support plate 14 at the connecting bars 54, 64 and would be mounted either on the base plate 12 or on other points or surfaces rigid with respect to the support or attachment plate 14. The mounting and positioning of the double universal-joint 30—52—30 need not be to and between the inner opposed faces of the attachment surfaces 12, 14. The distal yokes 34 could also be mounted on the outer faces of said plates or surfaces 12, 14, with the proximal yokes 36 also located at the corresponding outside position. In such a case, the connecting pillars 52 would be located beyond the limits of the sides of the support plate 14. This arrangement might be desired, for example, if said support plate or attachment surface 14 were to be suspended below the base plate 12 rather than supported above it as shown in FIGURES 1–3.

(D) The legs

The legs 16 serve a dual purpose. One purpose of said legs 16 is to guide the support plate 14 peripherally, so as to prevent it from tilting or tipping, that is to say, they confine the support plate 14 to displacements in which it maintains an orientation substantially parallel to the base plate 12. The second purpose of said legs 16 is to provide spring-loading of said support plate 14, both so that the entire load or stress applied to said plate 14 is not absorbed solely by the ball-and-socket type bearings 42—40—44, and so that said plate 14 will tend to return to its central or neutral position if displaced. In order to attain the object of the first purpose mentioned above, the legs 16 must be capable of universal action at each end, i.e., at each point of attachment to the plates 12, 14; while to attain the object of the second purpose, the legs 16 should incorporate a spring-loading feature such that they will tend to return to the upright position when tilted. Both objects are attained together by utilizing flexible rubber couplings 18 to attach the ends of the legs 16 to the plates 12, 14. Said flexible couplings 18 provide both universal action and spring-loading. At one end, said flexible couplings 18 are attached directly to the legs 16 by set screws 28 which lock said legs 16 to the metal sleeves 26 of said couplings 18. At the other end they are similarly attached to bolts 20 which are in turn fastened to the plates 12, 14 by lock-nuts 22 and washers 24.

(E) The compound couplings

The compound couplings 60—72—74, 60—58—18', 74—72a—74 connect the drive shafts 62, 76 with the support plate 14 via the connecting bars 54, 64. Because both the orientation and length of said compound couplings 60—72—74, 60—58—18', 74—72a—74 vary with the degree of displacement of the support plate 14 from the central or neutral position, they must be capable of extension, compression and bending. This can be accomplished in any of the three ways shown; coupling 60—72—74, coupling 60—58—18' or coupling 74—72a—74, or even by use simply of a length of spring wire (not shown). It is desirable to have ordinary universal joints 60 at the distal ends of the drive shafts 62, 76, so that transverse forces will not be brought to bear on said drive shafts 62, 76. Such transverse forces would lead to increased friction, wear and noise in the drive shaft bushings (not shown). Said ordinary universal joints 60 provide for free bending, while the flexible coupling 18' and coiled spring 74 provide for spring-loaded bending, compression and extension.

(F) The connecting bars

The connecting bars 54, 64 constitute the connecting link between the drive shafts 62, 76—via the compound couplings 60—72—74, 60—58—18'—and the support plate 14. Said connecting bars 54, 64 are affixed to the support plate 14 by bolts 56, 66. The connection to the terminal (distal) ends of the compound couplings 60—72—74, 60—58—18' can be carried out in at least two ways. In one of these, the flexible coupling 18', constituting the distal end of the compound coupling 60—58—18', is connected directly and permanently to the connecting bar 54. In the other, the length of spring wire constituting the distal end of the compound coupling 60—72—74 passes through an aperture 68 in the connecting-bar 64, and said length of spring wire can either slide loosely in this aperture 68 or be fixed in position therein by tightening a set screw 70. This is one of the several ways in which one of the drive shafts 76 can be simply and conveniently coupled or uncoupled from the support plate 14. Such coupling or uncoupling is particularly useful if it is desired to utilize the support plate 14 interchangeably in simple linear reciprocating motion at one time and planar motion at another, when both drive shafts 62, 76 are actuated by one and the same drive mechanism. To accomplish this, one simply tightens or loosens the set screw 70 which, when in the loosened position, allows the distal end of the compound coupling 60—72—74 to pass back and forth freely without communicating impulses to the connecting-bar 64.

(G) Materials

The recommended materials for the construction of the universal plate 10 are given in the following list. These materials are given for the sake of illustration only and are not all inclusive.

The support plate 14 and the base plate 12: Aluminum.
The connecting-bars 54, 64: Aluminum.
The right-angled axial cross-bars: Aluminum or steel.
The coupling pillars 52: Aluminum or steel.
The yokes 34, 36: Aluminum or steel.
The ball 40 and bearing pins 42, 44: Hardened steel.
The legs 16: Aluminum or steel.
The flexible couplings 18, 18': Flexible rubber couplings.
The drive shafts 62, 76: Hardened steel.
The universal joints 60: Ordinary universal joints.
The springs and spring wire 72, 72a, 74: Stainless steel.
The shaft 58: Aluminum or steel.

(H) Manner of operation and use

One double or two single drive mechanisms (not shown) of the type desired are connected via their drive shafts 62, 76 to the support plate 14. The drive mechanisms themselves are mounted on the projecting portion of the base plate 12. Considering first the case where outward linear displacement of the support plate 14 along the line or axis of the drive shaft 62 is desired, the appropriate linear displacement is fed into said drive shaft 62, whence it is communicated to the support plate 14 via the connecting-bar 54. A corresponding linear displacement of said support plate results. The upper yolk 34 moves with plate 14, first causing rotation of the upper joint 30 about its minor axis B—B, and secondly causing tilting of pillars 52 out of the plane of the paper (as shown in FIG. 2 of the drawing). The tilting of the pillars 52 causes a rotation of the lower joint 30 about its minor axis B'—B'. The amount of tilt of pillars 52 is not restricted by the legs 16, since said legs 16 are universally mounted at each end thereof by the flexible couplings 18, thus allowing the legs 16 to tilt in any desired direction. The amount of tilt of the pillars 52 is thus dictated only by the amount of input displacement applied to the support plate 14.

It will be seen that because of the tilting of pillars 52 and legs 16, the support plate 14 is displaced in the vertical direction—to a slightly lower level. Since the drive shaft 62 is mounted at a fixed level, changes in the compound coupling 60—58—18′ take place; the universal joint 60 connected to the drive shaft 62 bends slightly downward, while the flexible coupling 18′ bends slightly upward. On the inward linear stroke the reverse changes occur, until the central or neurtal position is reached. As the inward stroke continues beyond the neutral position, the first sequence of changes described above is repeated.

Considering the analogous linear displacements of the support plate 14 along the direction of the drive shaft 76, the sequence of events is the same except that (a) the double universal-joint 30—52—30 bends about the minor axes C—C and C′—C′, (b) the legs 16 tilt in a direction at right angles to the tilt mentioned above, and (c) the coiled spring 74 replaces the flexible coupling 18′. If, now, both drives shafts 62, 76 are actuated simultaneously, the displacements of the support plate 14 which take place are simply the vector sum of those occurring individually in each drive shaft, except for very small components introduced by bending, stretching and compression of the compound couplings 60—58—18′, 60—72—74 and very small vertical displacements of the plate 14 itself.

Any specific planar periodic or aperiodic displacements desired, no matter how complex, can be achieved by resolving such displacements into linear displacements along two perpendicular axes and subsequently feeding said resolved linear displacements into the two perpendicularly oriented drive shafts 62, 76.

It will be seen that if only the central double universal support 30—52—30 were present, the support plate 14 would be universally movable in every direction except that the movement of its center would be confined to a locus consisting of part of the surface of a sphere, along a radius of which the major axis A—A lies and of radius equal to the maximum allowed distance between plates 12 and 14, and except that it would not be rotatable in its own plane; in other words it could not be twisted about the major axis A—A. However, since the plate 14 would be tiltable about the upper universal joint 30, the legs 16 are provided to limit such tilting to such an extent as to make it a negligible factor.

Inasmuch as the legs 16 also have a double universal action, they permit unrestricted lateral displacement of the support plate 14 but confine it to remain substantially parallel to the base plate 12 to which said legs 16 are affixed.

Looking at our construction in another way, assume, for the moment, that central support 30—52—30 were not present, and that only legs 16 were present. The support plate 14 would still be laterally displaceable in any direction since its legs 16 could tilt in any direction. However, the support plate 14 would be rotatable in its own plane and would no longer be constrained to truly follow the displacements of the drive shafts 62, 76. By the addition of the novel central support structure 30—52—30, such rotation is prevented.

ADVANTAGES OF THE UNIVERSAL PLATE 10 OVER THE PRIOR ART (1) The universal plate 10 embodies operational simplicity, is rugged, and is of relatively simple construction.

(2) Said universal plate 10 is inherently silent in operation.

(3) Said universal plate 10 operates with a minimum of friction even under heavy loading.

(4) The universal plate 10 is of virtually unlimited load capacity.

(5) Said universal plate 10 embodies the use of flexible couplings 18 which give spring-loading under displacement of the support plate 14 from the central or neutral position, and which, by largely absorbing the weight of heavy loads minimize friction on the ball-and-socket type bearings 42—40—44.

(6) The support plate 14 of said universal plate 10 is freely displaceable in lateral translation, i.e., in any direction parallel to its plane, but incorporates at the same time substantial rotational rigidity within its own plane.

(7) By virtue of the substantial rigidity of the support plate 14 to rotation within its own plane, said universal plate 10 can be driven by drive shafts 62, 76 set at any position with respect to said support plate 14 and its legs 16, and oriented in any direction parallel to the plane of said support plate 14.

(8) The double universal-joint 30—52—30, comprising the central support and main motion-limiting guide of said support plate 14, utilizes ball-and-socket type bearings 42—40—44 of an adjustable type, such that play due to wear on said bearings 42—40—44 can be taken up by manual or automatic adjustment.

(9) The mechanical design of said universal plate 10 is such that by lengthening or shortening the distance of separation of the support plate 14 from the base plate 12, the extent of automatically induced vertical displacement of said support plate 14 in the course of its guided lateral translational displacement can be decreased or increased. It is thus possible to obtain displacements of said support plate 14 in three dimensions. This may be particularly desirable in the employment of the universal plate 10 as a component of a shaker or vibrator.

Having now described our invention and in what manner the same operates, what we claim as new, and desire to secure by Letters Patent are:

1. In apparatus of the class described, the combination of: means defining a working surface; means defining a fixed base surface; a first universally mounted means attached to said base surface and supporting said working surface for double universal displacement but substantially rigid to a rotational displacement in the plane of said working surface itself; and second universally-mounted supporting means attached to said base surface and supporting and constraining said working surface to substantially parallel displacements, whereby said working surface is laterally displaceable in any direction without being rotatable within its plane.

2. In apparatus of the class described, the combination of: means defining a working surface; means defining a fixed base surface; a first mounting means consisting of a double universal joint attached to said base surface and supporting said working surface for double universal displacement but substantially rigid to rotational displacement in the plane of said working surface itself; and second mounting means having double universal action attached to said base surface and supporting and constraining said working surface to substantially parallel displacements, whereby said working surface is laterally displaceable in any direction without being rotatable within its plane.

3. The apparatus of claim 2 wherein said first mounting means comprises: a first universal joint, said working surface being mounted thereto; a second universal joint spaced from said first universal joint, said second universal joint being mounted onto said base surface; and a rigid connecting member connected to each of said universal joints, preventing rotational displacement of said working surface in the plane of said working surface itself.

4. The apparatus of claim 2, wherein said second mounting means having double universal action comprises at least one support consisting of a rigid connecting member terminating in universal mountings, one of which universal mountings is affixed to said working surface and the other of which universal mountings is affixed to said base surface.

5. The apparatus of claim 4, wherein at least one of the two universal mountings embodied in said second mounting means is flexible and resilient, thereby providing an automatic centering and load-absorbing means for said working surface.

6. In apparatus of the class described, the combination of: means defining a working surface; means defining a fixed base surface; a first means for supporting said working surface for double universal displacement, but virtually rigid to a rotational displacement in the plane of said working surface, which includes a first universal joint to which said working surface is mounted, a second universal joint spaced from said first universal joint and mounted to said fixed base surface, and a rigid connector connecting said first and second universal joints, the combination preventing rotational displacement in the plane of said working surface itself; and a second means for constraining said working surface to substantially parallel displacements, which includes at least one support having double universal action, said support consisting of a rigid member terminating in universal mountings, one of which universal mountings is affixed to said working surface and the other of which universal mountings is affixed to said base surface.

7. The apparatus of claim 6, wherein said first support means is approximately centrally located with respect to said working surface, and said second support means is approximately peripherally located with respect to said working surface.

8. The apparatus of claim 6, wherein said first and second universal joints of said first support means comprise: a first cross-bar having two pairs of opposed ends, one pair of opposed ends having bearing means for being rotatably mounted onto said working surface; a second cross-bar having two pairs of opposed ends, one pair of opposed ends having bearing means for being rotatably mounted onto said fixed base surface; each of the remaining opposed ends of each of said cross-bars having bearing means for being rotatably mounted onto said connector.

9. The apparatus of claim 8, wherein the distance between opposed ends of each cross-bar is relatively great with respect to the dimensions of said bearing means for rotatably mounting said ends.

10. The apparatus of claim 8, wherein said bearing means are ball-and-socket bearings, and said sockets are adjustable to compensate for wear.

11. An apparatus of the class described, which comprises: means defining a fixed base surface; means defining a working surface; a first support member coupling said surfaces, said first support member being universally mounted at each of its ends to each of said surfaces and being rigid therebetween along a major axis to thereby prevent rotation of said working surface in its own plane about said major axis of said support member; and at least one second support member coupling said base and working surfaces, said second support member being flexibly and resiliently universally coupled at each end to each of said surfaces, whereby to confine said working surface to substantially parallel displacements and provide an automatic centering and load-absorbing means for said working surface; means for directing said working surface in one direction; and means for simultaneously directing said working surface in a second dissimilar direction, both of said directing means being adapted to be connected to a source of power whereby to produce varying modes of lateral displacement.

12. The apparatus of claim 11, wherein one of said directing means includes manual slip-out set screw means for readily uncoupling said directing means.

13. The apparatus of claim 11, which includes: at least one linking means adapted to be connected to driving means, said linking means including a compound linkage which is bendable, compressible and extensible, operably affixed to said working surface.

References Cited in the file of this patent

UNITED STATES PATENTS

| Number | Name | Date |
|---|---|---|
| 1,443,969 | Thiemer | Feb. 6, 1923 |
| 1,567,548 | Stebbins | Dec. 29, 1925 |
| 1,970,233 | Hertzberg | Aug. 14, 1934 |
| 2,064,392 | Swenson et al. | Dec. 15, 1936 |
| 2,242,215 | Johnson | May 20, 1941 |
| 2,247,978 | Van Arkel | July 1, 1941 |
| 2,255,799 | Meinzer | Sept. 16, 1941 |
| 2,397,585 | Anderson | Apr. 2, 1946 |
| 2,545,646 | Blinkman | Mar. 20, 1951 |
| 2,728,562 | Bailey | Dec. 27, 1955 |
| 2,757,908 | Broadwin | Aug. 7, 1956 |
| 2,793,010 | Menken | May 21, 1957 |